US010721660B2

(12) United States Patent
Hui et al.

(10) Patent No.: US 10,721,660 B2
(45) Date of Patent: Jul. 21, 2020

(54) TERMINAL-SPECIFIC CLUSTER OF ACCESS NODES FOR HIGH FREQUENCY WIRELESS ACCESS

(71) Applicant: Telefonaktiebolaget LM Ericsson (publ), Stockholm (SE)

(72) Inventors: Dennis Hui, Sunnyvale, CA (US); Johan Axnäs, Solna (SE); Kumar Balachandran, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 15/559,884

(22) PCT Filed: Mar. 20, 2016

(86) PCT No.: PCT/IB2016/051561
§ 371 (c)(1),
(2) Date: Sep. 20, 2017

(87) PCT Pub. No.: WO2016/151463
PCT Pub. Date: Sep. 29, 2016

(65) Prior Publication Data
US 2018/0063759 A1 Mar. 1, 2018

Related U.S. Application Data

(60) Provisional application No. 62/136,026, filed on Mar. 20, 2015.

(51) Int. Cl.
*H04W 36/02* (2009.01)
*H04W 24/10* (2009.01)
(Continued)

(52) U.S. Cl.
CPC ......... *H04W 36/023* (2013.01); *H04W 24/10* (2013.01); *H04W 36/08* (2013.01); *H04W 40/12* (2013.01)

(58) Field of Classification Search
CPC ... H04W 36/02; H04W 36/023; H04W 36/08; H04W 24/10; H04W 28/14; H04W 40/12
See application file for complete search history.

(56) References Cited

U.S. PATENT DOCUMENTS

2006/0062191 A1    3/2006  Matsumoto
2008/0254800 A1 * 10/2008  Chun ................... H04W 48/12
                                                                      455/438

(Continued)

FOREIGN PATENT DOCUMENTS

CN        1870591 A    11/2006
CN      101507327 A     8/2009

(Continued)

OTHER PUBLICATIONS

PCT International Search Report for International Application No. PCT/IB2016/051561—dated Jun. 20, 2016.
PCT Written Opinion of the International Searching Authority for International application No. PCT/IB2016/051561—dated Jun. 20, 2016.

(Continued)

*Primary Examiner* — Pao Sinkantarakorn
*Assistant Examiner* — Kabir U Jahangir
(74) *Attorney, Agent, or Firm* — Sage Patent Group

(57) ABSTRACT

A wireless communication network includes an assistant serving access node (415) and a principal serving access node (410). The principal serving access node (410) receives one or more measurement reports. The principal serving access node (410) communicates an assistance request to communicate one or more data packets. The assistant serving access node (415) buffers the one or more data packets before receiving the assistance request and communicates the one or more data packets to the user equipment (110).

27 Claims, 10 Drawing Sheets

(51) Int. Cl.
*H04W 36/08* (2009.01)
*H04W 40/12* (2009.01)

(56) References Cited

U.S. PATENT DOCUMENTS

| | | | |
|---|---|---|---|
| 2009/0046660 A1* | 2/2009 | Casati | H04W 36/02 370/331 |
| 2009/0046662 A1* | 2/2009 | Casati | H04W 36/02 370/331 |
| 2009/0061876 A1* | 3/2009 | Ho | H04W 99/00 455/436 |
| 2010/0227614 A1* | 9/2010 | Chun | H04L 1/1854 455/436 |
| 2011/0002304 A1* | 1/2011 | Lee | H04W 36/02 370/331 |
| 2013/0235844 A1 | 9/2013 | Ge et al. | |
| 2015/0146689 A1* | 5/2015 | Fu | H04J 3/0632 370/331 |
| 2016/0062191 A1 | 3/2016 | Matsushima | |

FOREIGN PATENT DOCUMENTS

| | | |
|---|---|---|
| CN | 101601225 A | 12/2009 |
| CN | 102695227 A | 9/2012 |
| CN | 103298043 A | 9/2013 |
| CN | 103428788 A | 12/2013 |
| CN | 104160633 A | 11/2014 |
| WO | 2011 070308 A1 | 6/2011 |

OTHER PUBLICATIONS

European Patent Office; Communication pursuant to Article 94(3) EPC; Application No. 16 712 080.7—1215; 7 pages, dated Sep. 27, 2018.

Yoshinor Kitatsuji; "On Handover Procedure with Data Forwarding for Reducing Buffered User Data in Base Stations;" IEEE Communications Society; 8 pages, 2009.

European Patent Office; Communication pursuant to Article 94(3) EPC; Application No. 16 712 080.7—1215; 5 pages, dated Feb. 19, 2019.

Chinese Office Action dated Feb. 3, 2020 for Chinese Patent Application No. 201680029066.0, 17 pages.

* cited by examiner

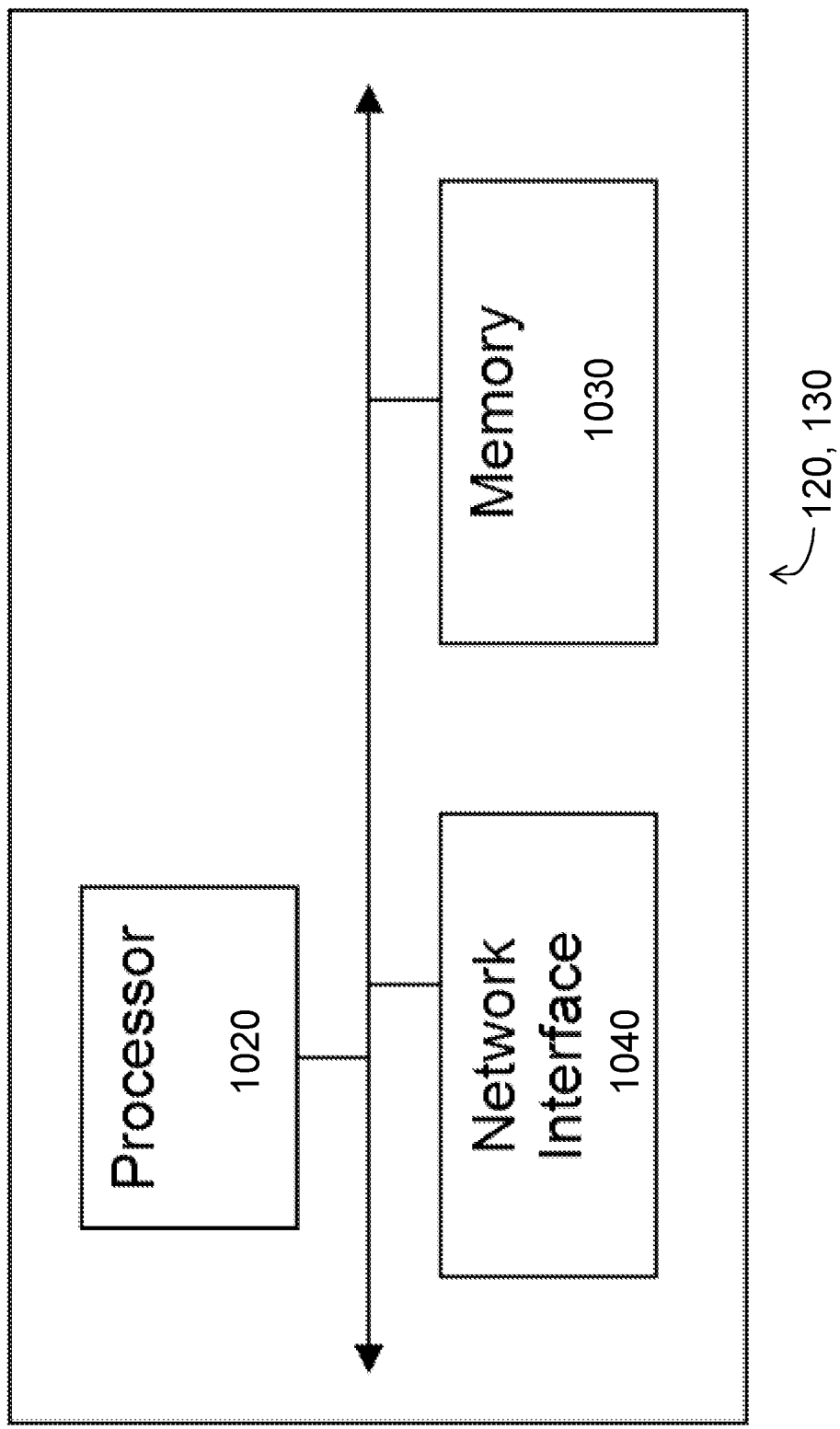

TERMINAL-SPECIFIC CLUSTER OF ACCESS NODES FOR HIGH FREQUENCY WIRELESS ACCESS

PRIORITY

This nonprovisional application is a U.S. National Stage Filing under 35 U.S.C. § 371 of International Patent Application Serial No. PCT/IB2016/051561 filed Mar. 20, 2016, and entitled "Terminal-Specific Cluster of Access Nodes for High Frequency Wireless Access" which claims priority to U.S. Provisional Patent Application No. 62/136,026 filed Mar. 20, 2015 both of which are hereby incorporated by reference in their entirety.

TECHNICAL FIELD

Embodiments of the invention relate to the field of wireless communication; and more specifically, to a terminal-specific cluster of access nodes for high frequency wireless access.

BACKGROUND

To cope with the exponential growth in mobile data traffic, it is anticipated that new radio spectra with substantially larger bandwidths for mobile communications will be needed in the future. As a result, technologies that enable wireless communications over high-frequency bands (e.g. millimeter-wave bands) where large amounts of under-utilized spectrum are available have received much attention recently.

Communicating wirelessly over high frequency bands, such as the millimeter wave (mmW) bands, introduces some challenges. Radio signals transmitted over such bands typically suffer from higher path loss between isotropic antennas than those transmitted over the lower frequency bands that are currently used in cellular communications. The problem is further exacerbated in the unlicensed 60 GHz band where radio signals suffer additional losses due to oxygen and rain absorption, especially over long link distances.

To overcome the resulting tight link budget, wireless communications over high frequency bands often rely on a large directional gain achieved by forming narrow beams of radio signals using, for example, an adaptively steerable antenna array. Fortunately, the shortened wavelengths in high frequency bands make it possible for a device, such as an access node (AN) or user equipment (UE), of reasonable size to be equipped with a relatively large number of antenna elements for narrow beamforming. However, due to the high spatial selectivity resulting from narrow beamforming, a UE or terminal in a mmW wireless network can quickly lose connection with its serving access node (AN) due to shadowing by other moving objects.

In traditional cellular networks, the received signal quality often degrades gradually prior to the need of a handover, leaving sufficient amount of time for both the network and the user equipment (UE) to prepare for switching of serving base stations or access nodes (ANs). In mmW wireless networks, however, due to the reduced effectiveness for radio signals at high frequencies to diffract around objects and the reliance on narrow beamforming to provide adequate link SNR for high data rates, the strongest signal path can be temporarily, but abruptly, blocked by an obstacle or lost due to device rotation, causing disruptions of data flow and consequent TCP backoffs. Conventional hard handover that involves long-distance control signaling across different radio access network components may be too slow to avoid service interruption in these systems operating at high frequencies. Methods that can provide faster switching of serving ANs with minimal UE involvement in these systems are therefore desirable.

SUMMARY

According to some embodiments, systems and methods for creating and maintaining a cluster of service nodes that reduces signal loss and service interruptions and improves data flow.

In one example embodiment, a wireless communication network includes an assistant serving access node and a principal serving access node. The principal serving access node receives one or more measurement reports and determines, based on a strength of a connection between the user equipment and the principal serving access node, that the user equipment should communicate over a different connection. The principal serving access node also, in response to the determination that the user equipment should communicate over the different connection and based on the one or more measurement reports, communicates an assistance request to the assistant serving access node to communicate one or more data packets to the user equipment. The assistant serving access node buffers the one or more data packets of the plurality of data packets before receiving the assistance request from the principal serving access node. The assistant serving access node also communicates the one or more data packets to the user equipment.

In another example embodiment, a principal serving access node includes an antenna and a processor. The antenna communicates with a user equipment. The processor receives one or more measurement reports and determines, based on a strength of a connection between the user equipment and the principal serving access node, that the user equipment should communicate over a different connection. The processor also, in response to the determination that the user equipment should communicate over the different connection and based on the one or more measurement reports, communicates an assistance request to the assistant serving access node to communicate one or more data packets to the user equipment. The processor further maintains a list identifying the assistant serving access node. The list indicates that the assistant serving access node has buffered the one or more data packets before the assistant serving access node received the assistance request.

In another example embodiment, a method includes receiving one or more measurement reports and determining, based on a strength of a connection between the user equipment and the principal serving access node, that the user equipment should communicate over a different connection. The method also includes, in response to the determination that the user equipment should communicate over the different connection and based on the one or more measurement reports, communicating an assistance request to the assistant serving access node to communicate one or more data packets to the user equipment. The method further includes maintaining a list identifying the assistant serving access node. The list indicates that the assistant serving access node has buffered the one or more data packets before the assistant serving access node received the assistance request Some embodiments of the disclosure may provide one or more technical advantages. For example, in certain embodiments, the systems and methods allow more robust performance against sudden signal interruptions. Some embodiments reduce data loss and/or dropped packets caused by signal interruptions. Certain embodiments reduce signal interruptions while a device is moving.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 10 is a block diagram illustrating certain embodiments of a radio network controller and/or a core network node.

DETAILED DESCRIPTION

Figure 1:
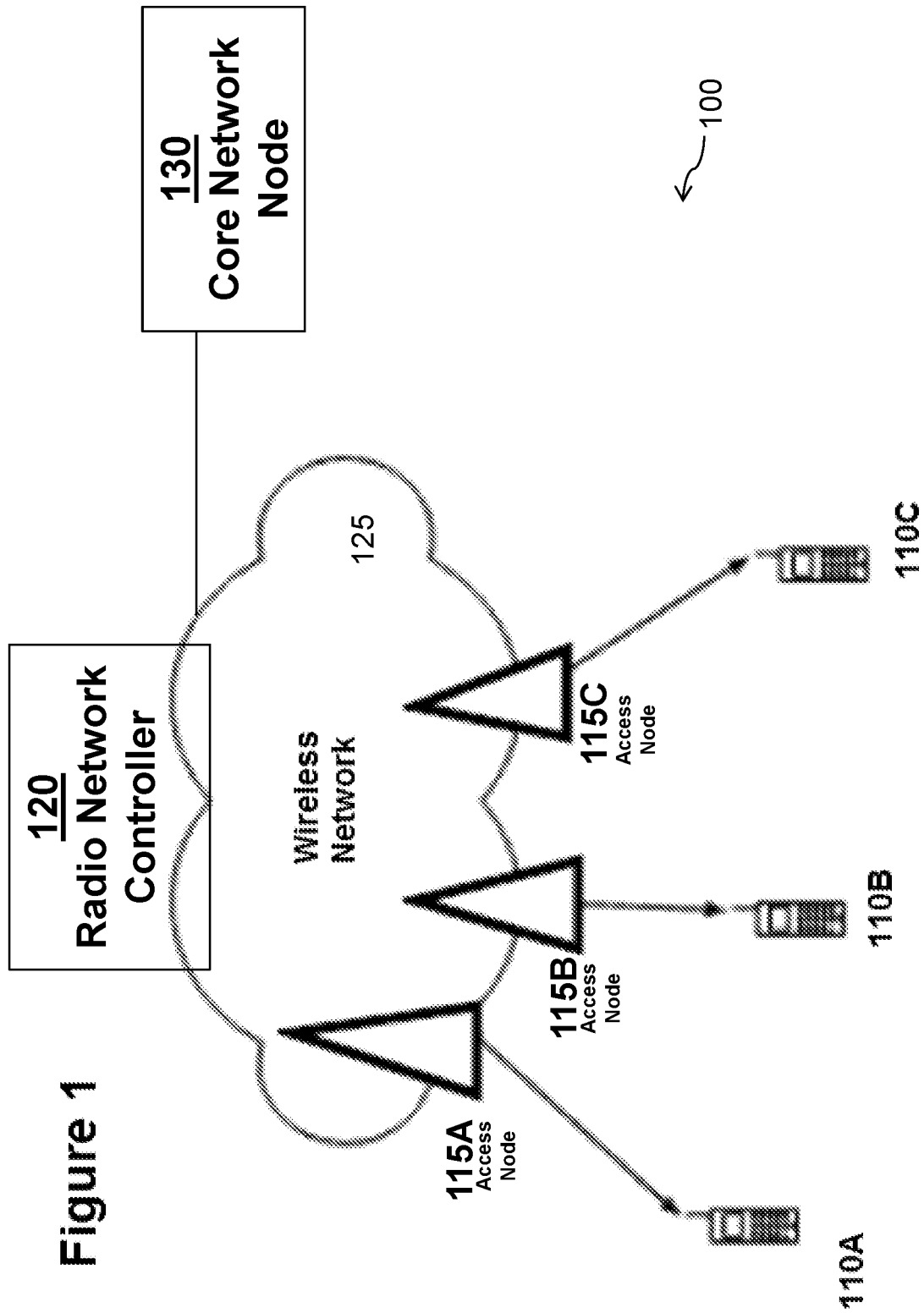
FIG. 1 illustrates an example network, according to certain embodiments.

Embodiments of the present disclosure and its advantages are best understood by referring to FIGS. 1 through 10 of the drawings, like numerals being used for like and corresponding parts of the various drawings.

In traditional cellular networks, the received signal quality often degrades gradually prior to the need of a handover, leaving sufficient amount of time for both the network and the user equipment (UE) to prepare for switching of serving base stations or access nodes (ANs). In networks that rely on beamsteering to establish a link between a transmitter and receiver, the use of a phased array to create narrow beams that improve the link signal-to-noise ratio (SNR) can lead to the temporary and abrupt loss of the strongest signal path. This effect is even more pronounced in mmW wireless networks due to the additional propagation effects at those frequencies of poor diffraction around edges of objects, the blocking of radio waves by an obstacle, etc. The consequence of abrupt stochastic outage events will be observed as a disruption in data throughput and will lead to TCP backoffs for typical network flows. Conventional hard handover that involves long-distance control signaling across different radio access network components may be too slow to avoid service interruption in these systems operating at high frequencies. Methods that can provide faster switching of serving ANs with minimal UE involvement in these systems are therefore desirable.

To achieve more robust performance against sudden signal interruptions, it is desirable to have a close cooperation among multiple ANs that are ready to serve a nearby UE. This disclosure contemplates forming a UE-specific or terminal-specific serving cluster (SvC) of ANs surrounding a UE that facilitates fast switching of serving beams among different ANs within the cluster. In other words, multiple ANs team up to serve each particular UE so that when the main beam from a serving AN is blocked, data flow can be quickly switched over to other beam(s) from or towards different AN(s) in the cluster. Each AN may belong to multiple clusters serving different UEs.

A Principal Serving Access Node (P-SAN) in each SvC is responsible for the connection between the SvC and its associated terminal. Most of the data flow between the terminal and the network passes directly through the P-SAN. Other ANs in the SvC are Assistant Serving Access Nodes (A-SAN) which act to provide diversity when the connection between the P-SAN and the terminal is lost (e.g. due to an obstacle). The P-SAN manages membership in the SvC and can proactively wake up sleeping ANs for inclusion in the SvC. A reliable backhaul connection with sufficiently low latency connects the P-SAN and each A-SAN in the SvC. A-SANs are typically lightly loaded nodes and may have spare radio resources and processing capacity to assist in the SvC. It is additionally beneficial to provision excess storage at the A-SAN to proactively buffer user data for forwarding to the UE.

SvCs of different terminals may overlap. Thus, an AN can simultaneously be an A-SAN in one SvC, while acting as a P-SAN for another SvC. In the role of A-SAN, an AN temporarily assists a P-SAN to communicate with its UE using spare resources that are dimensioned to provided excess capacity. When significant amount of data flows through an A-SAN, labeled A, for a reasonable period of time, the A-SAN will initiate network procedures for transfer of network context from the P-SAN, labeled B, to itself (A), after which the AN A assumes the role of P-SAN. The old P-SAN, B, may then assume the role of an A-SAN, or may be deleted from the SvC in the event that B is no longer able to fulfil the role of an A-SAN. The resulting migration of the role of the P-SAN within the SvC, and the subsequent addition or removal of ANs into the SvC in the role of A-SAN provides a way to gradually and smoothly track the long-term movement of a UE across the network.

Certain embodiments described herein may be beneficial in mmW wireless networks as radio signals of small wavelengths are severely attenuated when propagating through or around obstacles. The ability to quickly switch transmission direction or transmission point can be crucial for maintaining high-speed connections between the access nodes and UEs in these networks.

Embodiments described herein provide UE-specific clustering of ANs that surround a UE that can facilitate fast switching of serving beams among different ANs within the cluster. The associated process of cluster migration (described below) provides a way to slowly track the long-term movement of a UE across the network. It yields a desirable hysteresis effect in handling the potential rapid changes of connection points as terminals move in a densely, and possibly irregularly, deployed network. It is also well suited for distributed mobility management where no centralized mobility management entity is needed, which is particularly attractive for user-deployed, self-organizing networks.

Various other features and advantages will become obvious to one of ordinary skill in the art in light of the following detailed description and drawings.

FIG. 1 illustrates an example network 100, according to certain embodiments Network 100 includes one or more wireless devices 110A-C, which may be interchangeably referred to as wireless devices 110 or UEs 110, and network nodes 115A-C, which may be interchangeably referred to as network nodes 115, access nodes (AN) 115, or eNodeBs 115, radio network controller 120, and a core network node 130. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller 120. Radio network controller 120 may control network nodes 115 and may provide certain radio resource management functions, mobility management functions, and/or other suitable functions. In certain embodiments, radio network controller 120 may interface with core network node 130 via an interconnecting network 125. The interconnecting network 125 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and provide various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through network nodes 120.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Each of wireless communication device 110, network node 115, radio network controller 120, and core network node 130 include any suitable combination of hardware and/or software. Example embodiments of wireless devices 110, network nodes 115, and other network nodes (such as radio network controller or core network node) are described in more detail with respect to FIGS. 2, 3, and 10, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In certain embodiments, wireless communication device 110, network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 2:
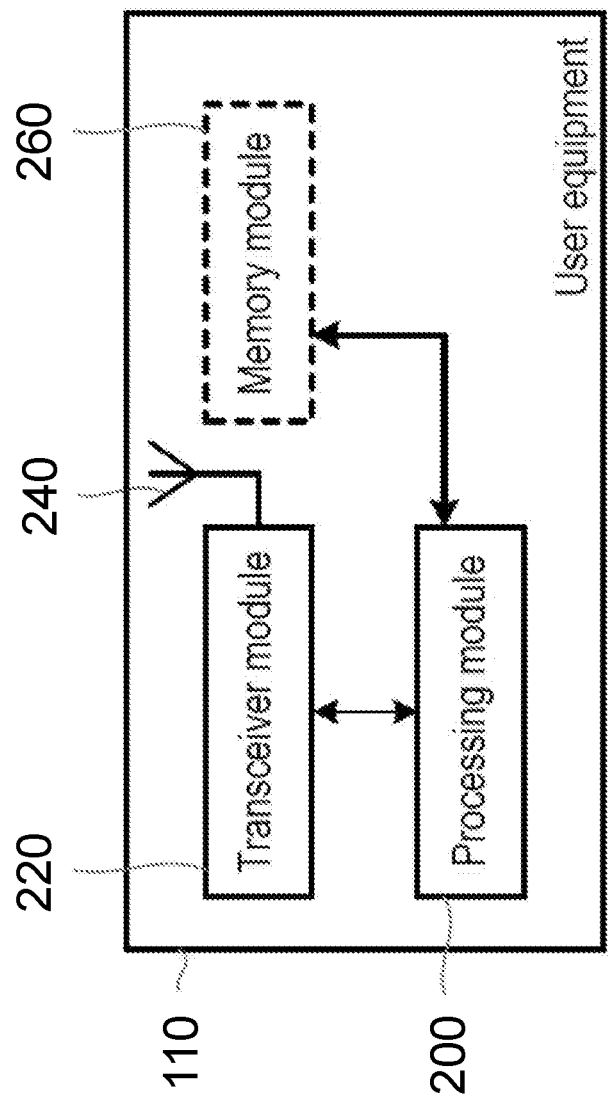
FIG. 2 illustrates an example wireless device, according to certain embodiments.

FIG. 2 illustrates an example wireless device or UE 110, according to certain embodiments. The UE 110 may in some embodiments be a mobile device that is configured for machine-to-machine (M2M) or machine-type communication (MTC). The UE 12 comprises a processing module 200 (also referred to as processor 200) that controls the operation of the UE 110. The processing module 200 is connected to a receiver or transceiver module 220 (also referred to as transceiver 220) with associated antenna(s) 240 which are used to receive signals from or both transmit signals to and receive signals from a base station 115 in the network 100. To make use of discontinuous reception (DRX), the processing module 200 can be configured to deactivate the receiver or transceiver module 220 for specified lengths of time. The user equipment 110 also comprises a memory module 260 (also referred to as memory 260) that is connected to the processing module 200 and that stores program(s) and other information and data required for the operation of the UE 110. In some embodiments, the UE 110 may optionally comprise a satellite positioning system (e.g. GPS) receiver module that can be used to determine the position and speed of movement of the UE 110.

In some embodiments, transceiver 220 facilitates transmitting wireless signals to and receiving wireless signals from network node 115 (e.g., via an antenna), processor 200 executes instructions to provide some or all of the functionality described above as being provided by wireless device 110, and memory 260 stores the instructions executed by processor 200.

Processor 200 may include any suitable combination of hardware and software implemented in one or more modules to execute instructions and manipulate data to perform some or all of the described functions of wireless device 110. In some embodiments, processor 200 may include, for example, one or more computers, one or more central processing units (CPUs), one or more microprocessors, one or more applications, and/or other logic.

Memory 260 is generally operable to store instructions, such as a computer program, software, an application including one or more of logic, rules, algorithms, code, tables, etc. and/or other instructions capable of being executed by a processor. Examples of memory 260 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 2 that may be responsible for providing certain aspects of the wireless device's functionality, including any of the functionality described above and/or any additional functionality (including any functionality necessary to support the solution described above).

Figure 3:
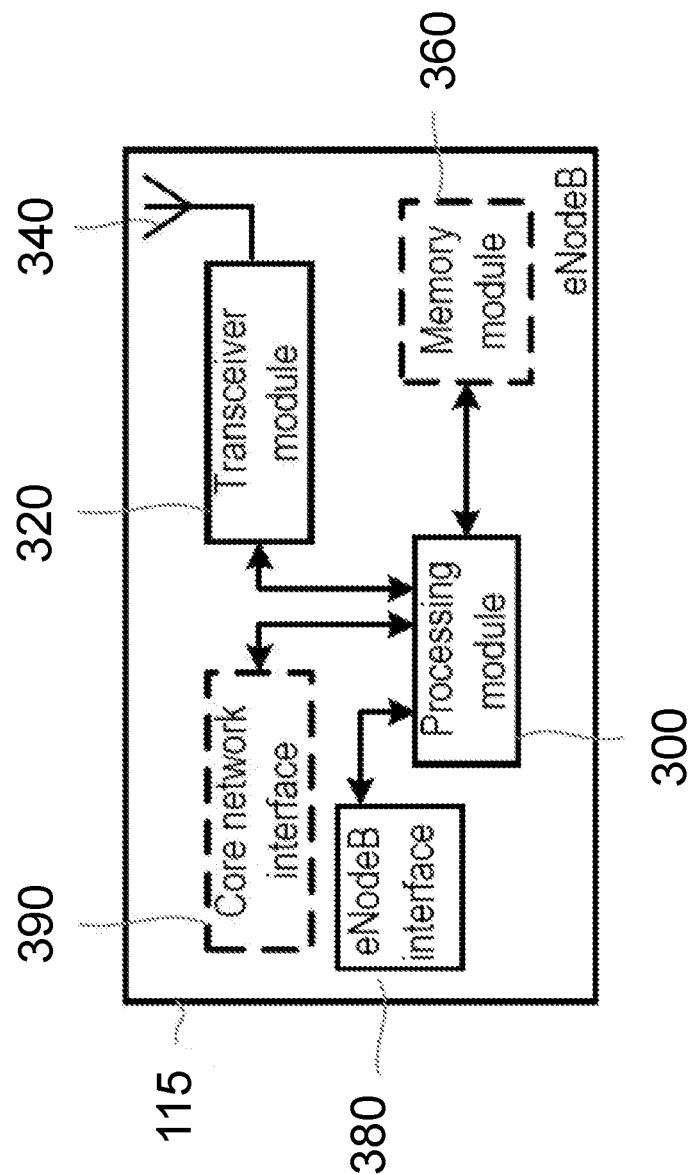
FIG. 3 illustrates an example access node, according to certain embodiments.

FIG. 3 illustrates an example access node 115, according to certain embodiments. As described above, access node 115 (also referred to as a network node 115 and base station 115) may be any type of radio network node or any network node that communicates with a wireless device and/or with another network node 115. Examples of a network node 115 are provided above.

It will be appreciated that although a macro eNB (evolved NodeB, base station) will not in practice be identical in size and structure to a micro eNB, for the purposes of illustration, the base stations are assumed to include similar components. Thus, the base station 115 comprises a processing module 300 (also referred to as processor 300) that controls the operation of the base station 115. The processing module 300 is connected to a transceiver module 320 (also referred to as transceiver 320) with associated antenna(s) 340 which are used to transmit signals to, and receive signals from, UEs 110 in the network 100. The base station 115 also comprises a memory module 360 (also referred to as memory 360) that is connected to the processing module 300 and that stores program(s) and other information and data used for the operation of the base station 115. The base station 115 also includes components and/or circuitry 380 for allowing the base station 115 to exchange information with other base stations 115 (for example via an X2 interface) and components and/or circuitry 390 for allowing the base station 115 to exchange information with nodes in the core network (for example via the Si interface). It will be appreciated that base stations for use in other types of network (e.g. UTRAN or WCDMA RAN) will include similar components to those shown in FIG. 2 and appropriate interface circuitry 380, 390 for enabling communications with the other network nodes in those types of networks (e.g. other base stations, mobility management nodes and/or nodes in the core network).

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 320, processor 300, memory 360, and network interface 380, 390. In some embodiments, transceiver 320 facilitates transmitting wireless signals to and receiving wireless signals from wireless device 110 (e.g., via an antenna), processor 300 executes instructions to provide some or all of the functionality described above as being provided by a network node 115, memory 360 stores the instructions executed by processor 300, and network interface 380, 390 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 300 may include any suitable combination of hardware and software implemented in one or more modules to execute instructions and manipulate data to perform some or all of the described functions of network node 115. In some embodiments, processor 300 may include, for example, one or more computers, one or more central processing units (CPUs), one or more microprocessors, one or more applications, and/or other logic.

Memory 360 is generally operable to store instructions, such as a computer program, software, an application including one or more of logic, rules, algorithms, code, tables, etc. and/or other instructions capable of being executed by a processor. Examples of memory 360 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 380, 390 is communicatively coupled to processor 300 and may refer to any suitable device operable to receive input for network node 115, send output from network node 115, perform suitable processing of the input or output or both, communicate to other devices, or any combination of the preceding. Network interface 380, 390 may include appropriate hardware (e.g., port, modem, network interface card, etc.) and software, including protocol conversion and data processing capabilities, to communicate through a network.

Other embodiments of network node 115 may include additional components beyond those shown in FIG. 2 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

UE-Specific Serving Cluster

Figure 4:
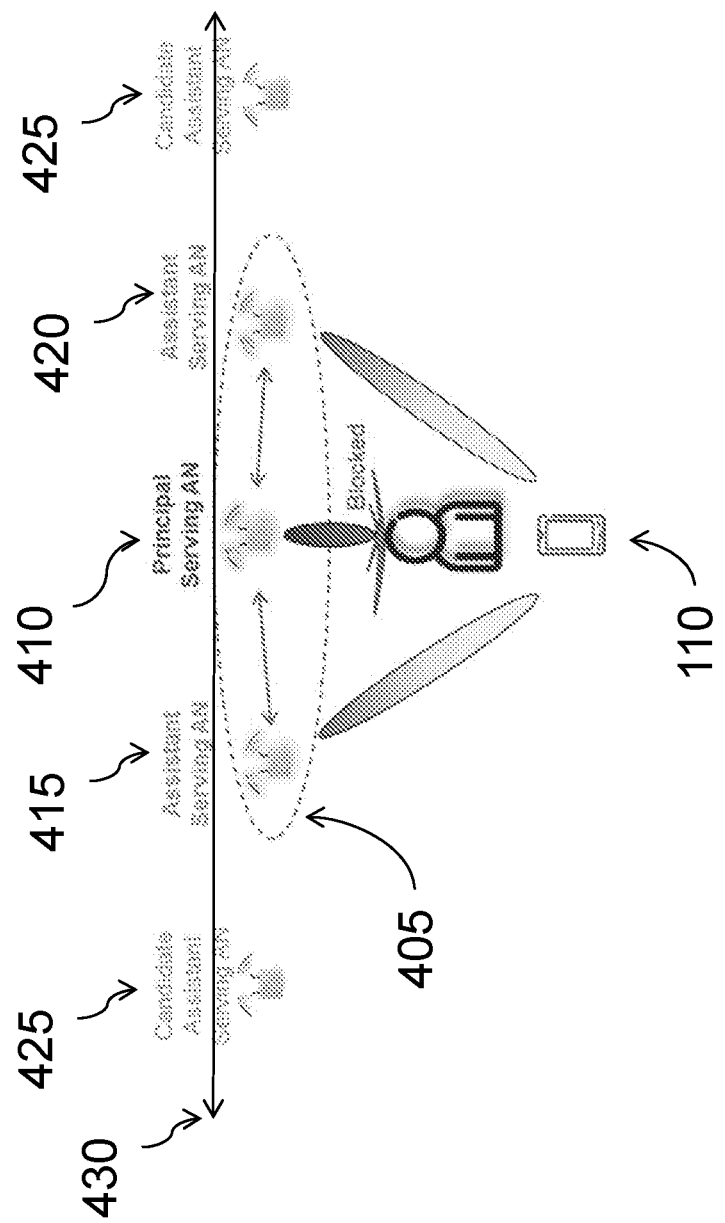
FIG. 4 illustrates an example network configuration, according to certain embodiments.

A UE-specific serving cluster (SvC) is a group of access nodes (ANs) 115 that are located in the vicinity of a user equipment (UE) 110 and are ready to serve the UE 110. Because a cluster is centered around a UE 110, each UE 110 has its own UE-specific serving cluster. One of the ANs 115 in the cluster acts as the main serving node that is responsible for the connection between the SvC and the UE 110. We refer to this AN 115 as the Principal Serving Access Node (P-SAN) of the SvC. A P-SAN handles the majority of data to be sent to and to be received from the UE 110. All other ANs 115, if any, in the SvC are Assistant Serving Access Nodes (A-SANs), whose responsibility is to provide temporary assistance to P-SAN when the connection between the P-SAN and the UE 110 is lost (e.g. due to an obstacle), as illustrated in FIG. 4. In the case when there is no A-SAN available in a SvC, the SvC may include only the P-SAN, and the P-SAN simply serves the same role as the serving AN 115 in a traditional wireless network. The UE-specific SvC can therefore be viewed as a generalization of the basic serving-cell concept in traditional cellular networks to more transmission/reception points.

FIG. 4 illustrates an example network configuration, according to certain embodiments. As illustrated in FIG. 4, the SvC includes UE 110, P-SAN 410, A-SANs 415 and 420, Candidate A-SANs 425, and backhaul network 430. P-SAN 410, A-SAN 415, and A-SAN 420 form a SvC 405. UE 110 communicates primarily with P-SAN 410, but can also communicate with any of A-SAN 415 and A-SAN 420 as needed.

P-SAN 410 is the AN 115 in SvC 405 that is responsible for maintaining the connection between SvC 405 and UE 110. P-SAN 410 is intended to be the main serving AN 115 for UE 110, and data blocks associated with UE 110 are communicated directly through P-SAN 410 most of the time. In the case when the direct connection between P-SAN 410 and UE 110 is lost, data blocks may be communicated through one or more A-SAN(s) 415 and 420 in SvC 405 instead. However, P-SAN 410 is responsible for keeping track of all unacknowledged data blocks for UE 110 and scheduling/requesting re-transmissions when needed, regardless of which SAN(s) in the SvC 405 is/are used to connect with the UE 110. A reliable backhaul connection 430 with sufficiently low latency exists between P-SAN 410 and each A-SAN 415 and 420.

As a member of SvC 405, each A-SAN 415 and 420 may buffer user data intended for UE 110. As a result, when P-SAN 410 loses its connection with UE 110 and instructs one or more of A-SANs 415 and 420 to communicate with UE 110, each A-SAN 415 and 420 will be ready to send user data to UE 110.

For example, P-SAN 410 may receive from each AN 115 (including A-SANs 415 and 420) or UE 110 a measurement report indicating the strength of a connection between that AN 115 and UE 110. This disclosure contemplates the measurement report including any type of information, such as for example, a recent history of acknowledgements (ACK) and negative acknowledgements (NACK) feedback of the packets received at UE 110. ACKs are sent by UE 110 when a packet is received correctly and NACKs are sent by UE 110 when packets are not received or not received correctly. It should be well known to those skilled in the art that the determination of correctly received packets can be made based on redundant bits (e.g. Cyclic Redundancy Check (CRC) bits) commonly added to the packet for error detection.) If the history shows several consecutive NACKs (e.g. the number of consecutive NACKs fed back from UE 110 to P-SAN 410 or A-SAN 415 exceeds a certain predetermined threshold), the strength of a connection may be determined as weak, and vice versa. As another example, the measurement report may include a received signal strength indicator (RSSI) and/or a channel quality indicator (CQI). Both the RSSI and the CQI may indicate a strength of a connection between the AN 115 and UE 110. If either of the RSSI and/or the CQI fall below a predetermined threshold, the connection may be determined as weak, and vice versa.

Based on the strengths of those connections, P-SAN 410 can determine which AN 115 can best communicate with UE 110 at any given time. P-SAN 410 also measures the strength of its connection with UE 110. When the strength of that connection becomes weak (e.g. because UE 110 is blocked by an obstacle), P-SAN 410 may determine that another AN 115 should be used to communicate temporarily with UE 110 over a different connection. P-SAN 410 determines the A-SAN 415 or 420 with the strongest connection to UE 110 and instructs that A-SAN 415 or 420 to begin communicating with UE 110. Supposing in this example that A-SAN 415 has the strongest connection, P-SAN 410 communicates an assistance request to A-SAN 415 instructing A-SAN 415 to begin communicating with UE 110. Because A-SAN 415 buffered user data intended for UE 110 before the assistance request was communicated, A-SAN 415 will be able to begin communicating user data to UE 110 soon after it receives the assistance request. An example, corresponding method is described below.

In particular embodiments, A-SAN 415 or 420 includes multiple antennas. Each antenna is positioned to face a direction different from the other antennas. In this manner, each antenna can transmit signals in a different direction from the other antennas. In these circumstances, a measurement report for A-SAN 415 or 420 includes reports for each antenna. As a result, the report indicates a strength of a connection between each antenna and UE 110.

P-SAN 410 maintains a list of A-SANs 415 and 420 included in SvC 405 in certain embodiments. The list identifies the A-SANs 415 and 420 and may also indicate the strength of a connection between each A-SAN 115 or 420 and UE 110. P-SAN 410 may consult this list when determining whether to instruct an A-SAN 415 or 420 to communicate with UE 110. The list also indicates that each A-SAN 415 and 420 on the list has buffered user data intended for UE 110 before P-SAN 410 communicates an assistance request to A-SAN 415 or 420 requesting A-SAN 415 or 420 to communicate with UE 110.

Figure 5:
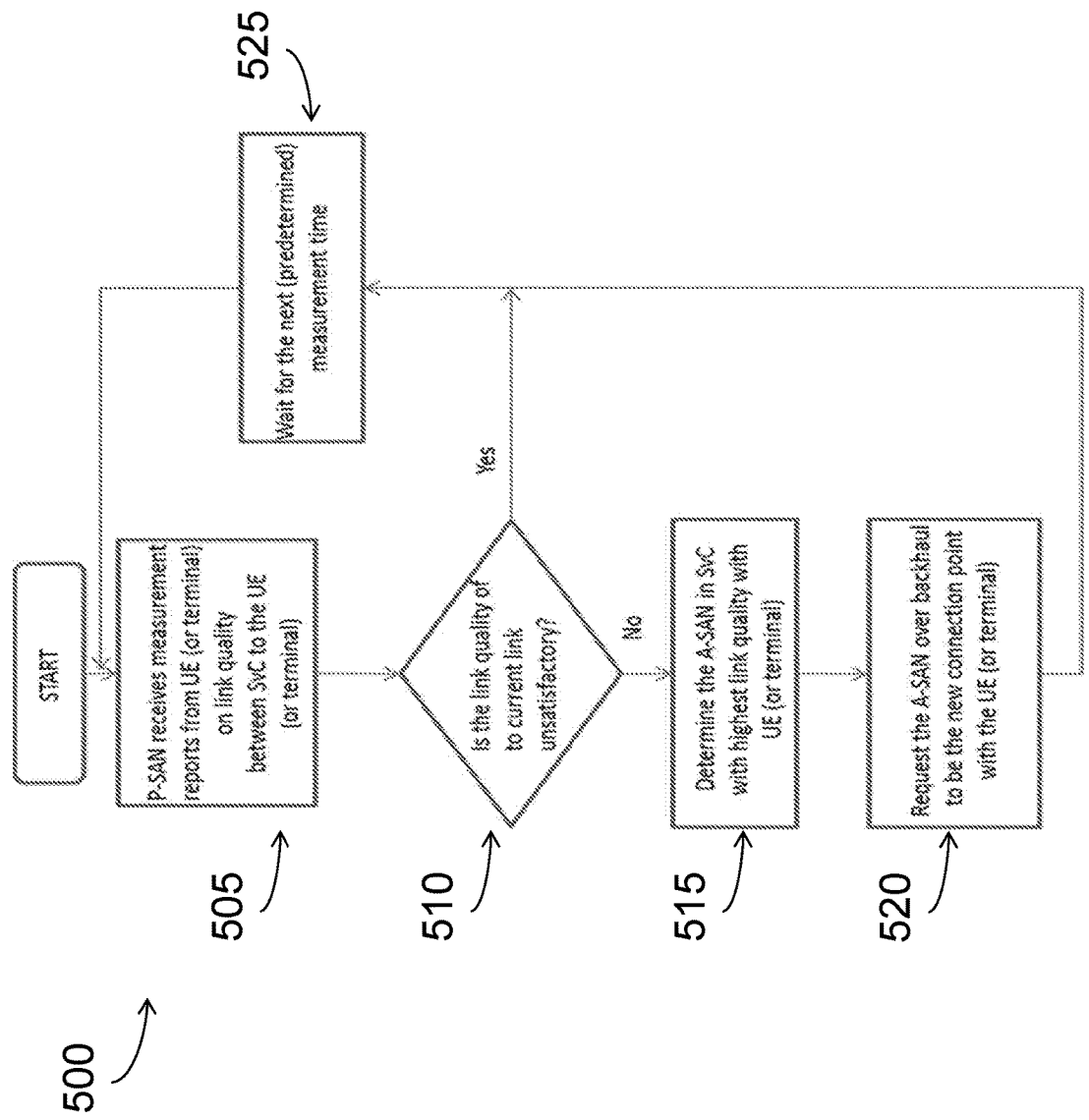
FIG. 5 illustrates an example method for transferring a connection from a principal serving access node to an assistant serving access node, according to certain embodiments.

FIG. 5 illustrates an example method 500 for transferring a connection from a principal serving access node (P-SAN) to an assistant serving access node (A-SAN), according to certain embodiments. As illustrated in FIG. 5, the P-SAN receives measurements reports from the UE or other ANs indicating link quality between the UE and the ANs in step 505. In step 510, the P-SAN evaluates whether the quality of its current link with the UE is unsatisfactory, In particular embodiments, the P-SAN may determine whether the quality of the link is satisfactory based on a threshold. If the quality of the link is satisfactory, the P-SAN waits for the next (predetermined) measurement time in step 525. In one embodiment, the quality of the link is evaluated based on a recent history of ACKs and NACKs from the UE to the P-SAN. For example, the link may be deemed satisfactory if the most recent ACKs/NACKs sent by the UE include two or more consecutive ACKs, while the quality of the link may be deemed unsatisfactory if there are two or more consecutive NACKs. In one embodiment, the quality of the link is evaluated based on a RSSI and/or a CQI of the UE. If the RSSI and/or CQI fall below a predetermined threshold, the P-SAN may determine that the link is unsatisfactory, and if the RSSI and/or CQI meet and/or exceed the threshold, the P-SAN may determine that the link is satisfactory.

If the quality of the link is unsatisfactory, the P-SAN determines the A-SAN in the SvC with the highest link quality with the UE in step 515. Then, the P-SAN requests the A-SAN over the backhaul connection to be the new connection point with the UE. In particular embodiments, the P-SAN makes this request by communicating an assistance request to the A-SAN. Because the A-SAN has buffered user data intended for the UE as part of being a member of the SvC, the A-SAN is prepared to begin transmitting user data to the UE when it receives the assistance request. As a result, the UE will experience little to no data loss resulting from a weak signal with the P-SAN.

Figure 6:
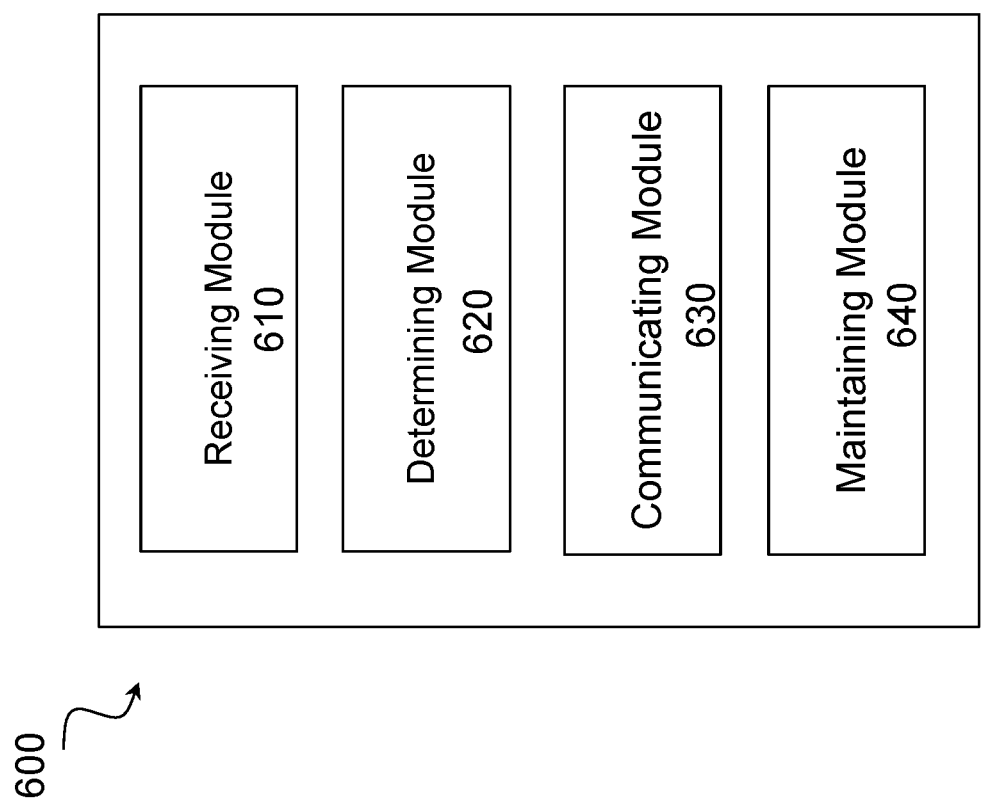
FIG. 6 is a block diagram illustrating a computer networking virtual apparatus, according to certain embodiments.

In certain embodiments, method 500 as described above may be performed by a computer networking virtual apparatus. FIG. 6 illustrates an example computer networking virtual apparatus 600 for performing method 500, according to certain embodiments. In certain embodiments, virtual computing device 600 may include modules for performing steps similar to those described above with regard to the method illustrated and described in FIG. 5. For example, computer networking virtual apparatus 600 may include at least one receiving module 610, a determining module 620, a communicating module 630, a maintaining module 640, and any other suitable modules. In some embodiments, one or more of the modules may be implemented using one or more processors 300 of FIG. 3. In certain embodiments, the functions of two or more of the various modules may be combined into a single module.

The receiving module 610 may perform the receiving functions of computer networking virtual apparatus 600. For example, receiving module 610 may receive measurement reports from other ANs or A-SANs.

The determining module 620 may perform the determining functions of computer networking virtual apparatus 600. For example, determining module 620 may determine that a connection with a UE 110 is unsatisfactory and that communication with the UE should occur over a different connection. As another example, determining module 620 may determine the A-SAN with the best and/or highest quality connection with the UE.

The communicating module 630 may perform the communicating functions of computer networking virtual apparatus 600. For example, communicating module 430 may communicate an assistance request to an A-SAN to instruct the A-SAN to begin transmitting user data to the UE.

The maintaining module 640 may perform the maintaining functions of computer networking virtual apparatus 600. For example, maintaining module 640 may maintain a list of all the A-SANs in the SvC. As a result, the list indicates the A-SANs that have buffered user data intended for the UE. The list may also indicate the strength of the connections between each A-SAN and the UE. This list can be consulted to determine which A-SAN should transmit user data to the UE.

Other embodiments of computer networking virtual apparatus 600 may include additional components beyond those shown in FIG. 6 that may be responsible for providing certain aspects of the network node's 115 functionality, including any of the functionality described above and/or any additional functionality (including any functionality necessary to support the solutions described above). The various different types of devices 115 may include components having the same physical hardware but configured (e.g., via programming) to support different radio access technologies, or may represent partly or entirely different physical components.

The main function of an A-SAN 415 or 420 is to temporally assist P-SAN 410 in transmitting/receiving data to/from UE 110 when the direct connection between UE 110 and P-SAN 410 is lost or weakened. Hence, for an AN 115 to be qualified as an A-SAN for SvC 405, it cannot be fully loaded already and should have enough spare radio resources, transmit power, and processing capability (e.g. in terms of spare radio chains and baseband processing cycles) in order to provide the assistance. In addition, it is desirable for an A-SAN to also possess adequate free memory for proactively buffering UE data so that user data may be immediately forwarded to or received from UE 110 in the next scheduled radio resource assignment to avoid any service interruption. P-SAN 410 should take these factors into account when deciding whether to include or exclude an AN 115 in the SvC 405, and, if included, how to schedule for the assistance provided by different A-SANs with different resource availabilities.

If proactive buffering of UE's data can be adopted at an A-SAN in the downlink, the A-SAN may continually retrieve unacknowledged data blocks from P-SAN 410 (if a high-data-rate backhaul connection exists) or directly from a network gateway and discard acknowledged data blocks, even if the A-SAN's assistance is not needed by P-SAN 410. Termination of the link layer may take place at P-SAN 410. Alternatively, if proactive buffering cannot be used (e.g. due to the lack of memory in A-SAN or limitation in backhaul capacity), the A-SAN may retrieve unacknowledged data blocks only after receiving request signals from P-SAN 410. With such a reactive approach, additional delay may be incurred, which should be taken into account by P-SAN 410 when scheduling future radio resources for communicating with UE 110.

Similarly, in the uplink, the A-SAN may forward received data to P-SAN 410 or, alternatively, to the last mobility gateway function (MGF) for termination of the link layer. For the latter, the act of forwarding directly to the MGF may be accompanied by a request to P-SAN 410 indicating capture of the link and asking for forwarding of buffered data towards the MGF for termination of the link.

Even when there is no data transmission from or to an A-SAN, the A-SAN should periodically transmit known pilot signals on certain test beams, as directed by P-SAN 410, in some scheduled radio resources dedicated to UE 110, so that the A-SAN can be readily aware of which beam to use to transmit to or received from UE 110 when needed. Hence, each A-SAN must also be able to established a low-latency inter-AN connection with P-SAN 410 in order to support fast exchange of control signaling, as well as scheduling and hardware state (e.g. buffer, load) information.

P-SAN 410 is also responsible for recruiting other ANs 115 who have a good wireless connection with UE 110 as A-SANs. It may proactively wake up neighboring ANs 115 (e.g. Candidate ANs 425) from a sleep mode and negotiate their admission as A-SANs into SvC 405 (e.g., receiving and analyzing a measurement report from the AN 115 after it wakes). P-SAN 410 makes request to (potential) A-SANs for measurement reports on the links between (potential) A-SANs and UE 110. Based on the measurement reports, P-SAN 410 makes the decision on which AN 115 to recruit and whether to include or exclude an AN 115 as A-SAN.

P-SAN 410 is responsible for both addition and removal of A-SAN in SvC 405. P-SAN 410 communicates requests to ANs 115 (e.g. A-SAN 415, A-SAN 420, and Candidate A-SANs 425) to have them join SvC 405. When an AN 115 (e.g. A-SAN 415, A-SAN 420, or Candidate A-SANs 425) receives the request, the AN 115 can join SvC 405 and begin buffering user data intended for UE 110.

For example, based on measurement reports from A-SAN 415, A-SAN 420, Candidate A-SANs 425, and/or UE 110, P-SAN 410 may determine whether to add a candidate A-SAN 425 into SvC 405 and whether to remove an A-SAN 415 and/or 420 from SvC 405. For example, if a connection between A-SAN 420 and UE 110 begins to degrade due to UE 110 movement, P-SAN 410 may determine that A-SAN 420 should be removed from SvC 405. P-SAN 410 may communicate a request to A-SAN 420. When A-SAN 420 receives the request, A-SAN 420 may remove itself from SvC 405 and stop buffering user data intended for UE 110. As another example, if a connection between Candidate A-SAN 425 and UE 110 becomes strong due to UE 110 movement, P-SAN 410 may add Candidate A-SAN 425 to SvC 405. P-SAN 410 may communicate a request(s) to any of the Candidate A-SANs 425 to join SvC 405. When a Candidate A-SAN 425 receives the request, the Candidate A-SAN 425 may join SvC 405 and begin buffering user data intended for UE 110. In this manner, the Candidate A-SAN 425 may be ready to begin transmitting data to UE 110 if P-SAN 410 requests assistance.

Figure 7:
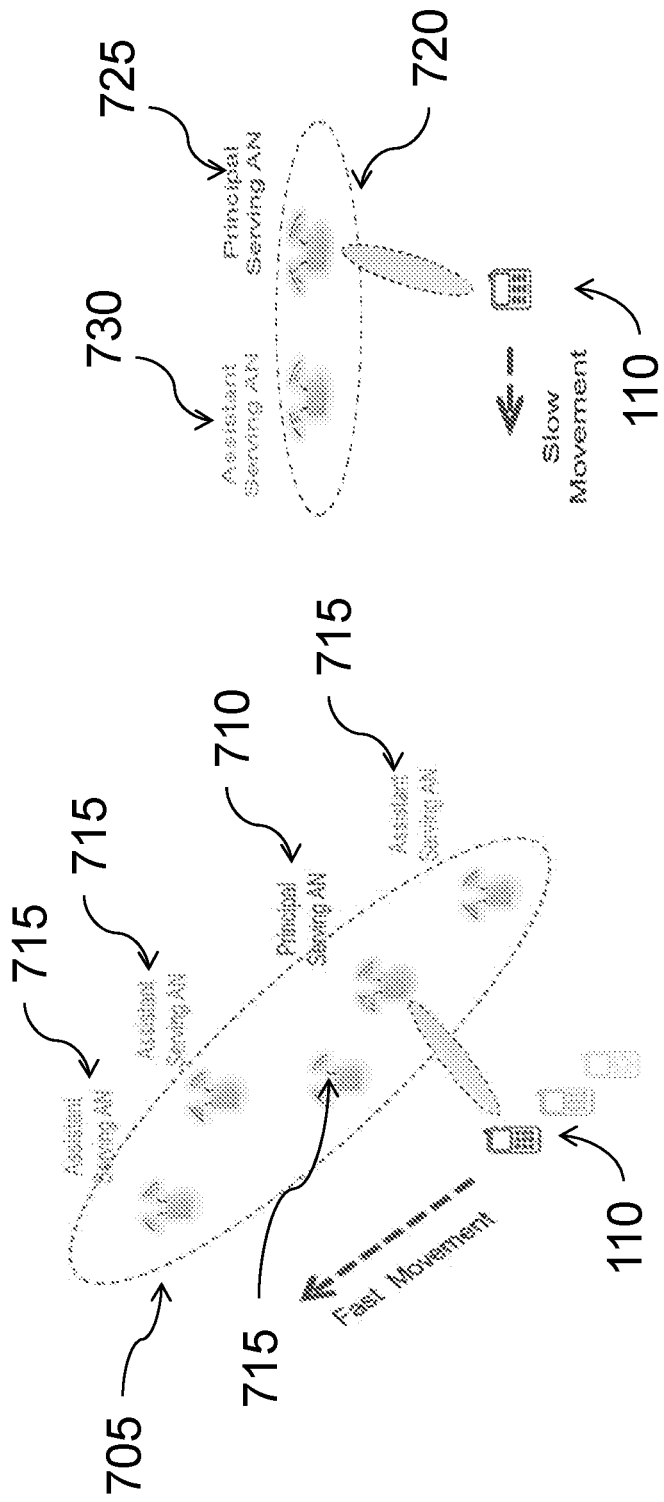
FIG. 7 illustrates example network configurations, according to certain embodiments.

P-SAN 410 may also recruit a Candidate AN 425 as A-SAN even if it does not currently have a good wireless link with UE 110, so long as it has the potential of having a good link with UE 110 in the future. Such a determination may, for example, be based on periodic estimates of the direction of movement and the Doppler frequency of UE 110 to determine which Candidate ANs 425 to recruit as A-SAN in order to minimize the probability of connection outage with UE 110. Depending on the Doppler estimates of UE 110, the number of ANs 115 in SvC 405 may vary. As illustrated in FIG. 7, when UE 110 is moving fast, more ANs 115 in the direction of movement may be recruited as A-SAN. In general, the size of SvC 405 depends on the perceived level of uncertainty in connecting with UE 110.

P-SAN 410 may have added A-SAN 415 or 420 to SvC 405 in an analogous manner. For example, P-SAN 410 may have received measurement reports from UE 110 and/or A-SAN 415 or 420. Based on those measurement reports, P-SAN 410 may determine that A-SAN 415 or 420 would be able to communicate well with UE 110. In response to that determination, P-SAN 410 communicates a request to A-SAN 415 or 420 to join SvC 405. If A-SAN 415 or 420 join SvC 405, they begin buffering user data intended for UE 110 in case they are requested to transmit that user data to UE 110.

Similarly, P-SAN 410 can decide to remove A-SAN 415 or 420 from SvC 405. For example, P-SAN 410 may have received measurement reports from UE 110 and/or A-SAN 415 or 420. Based on those measurement reports, P-SAN 410 may determine that A-SAN 415 or 420 would no longer be able to communicate well with UE 110. In response to that determination, P-SAN 410 communicates a request to A-SAN 415 or 420 to leave SvC 405. If A-SAN 415 or 420 leave SvC 405, they stop buffering user data intended for UE 110.

FIG. 7 illustrates example network configurations, according to certain embodiments. As illustrated in FIG. 7, P-SAN 710 may include fewer or more A-SANs in SvC 705 and 720 depending on the movement of UE 110. For example, when UE 110 is moving quickly through an area, P-SAN 710 may include four A-SANs 715 in SvC 705. There may be more A-SANs located in the measured direction of travel of UE 110. As described above, the speed and direction of travel may be determined using Doppler estimates of UE 110. As another example, P-SAN 725 may include fewer A-SANs 730 in SvC 720 if UE 110 is moving slowly through an area. As illustrated in FIG. 7, SvC 720 includes only one A-SAN 730 as opposed to four A-SANs of SvC 705 because UE 110 is moving slowly. An example, corresponding method is described below.

Figure 8:
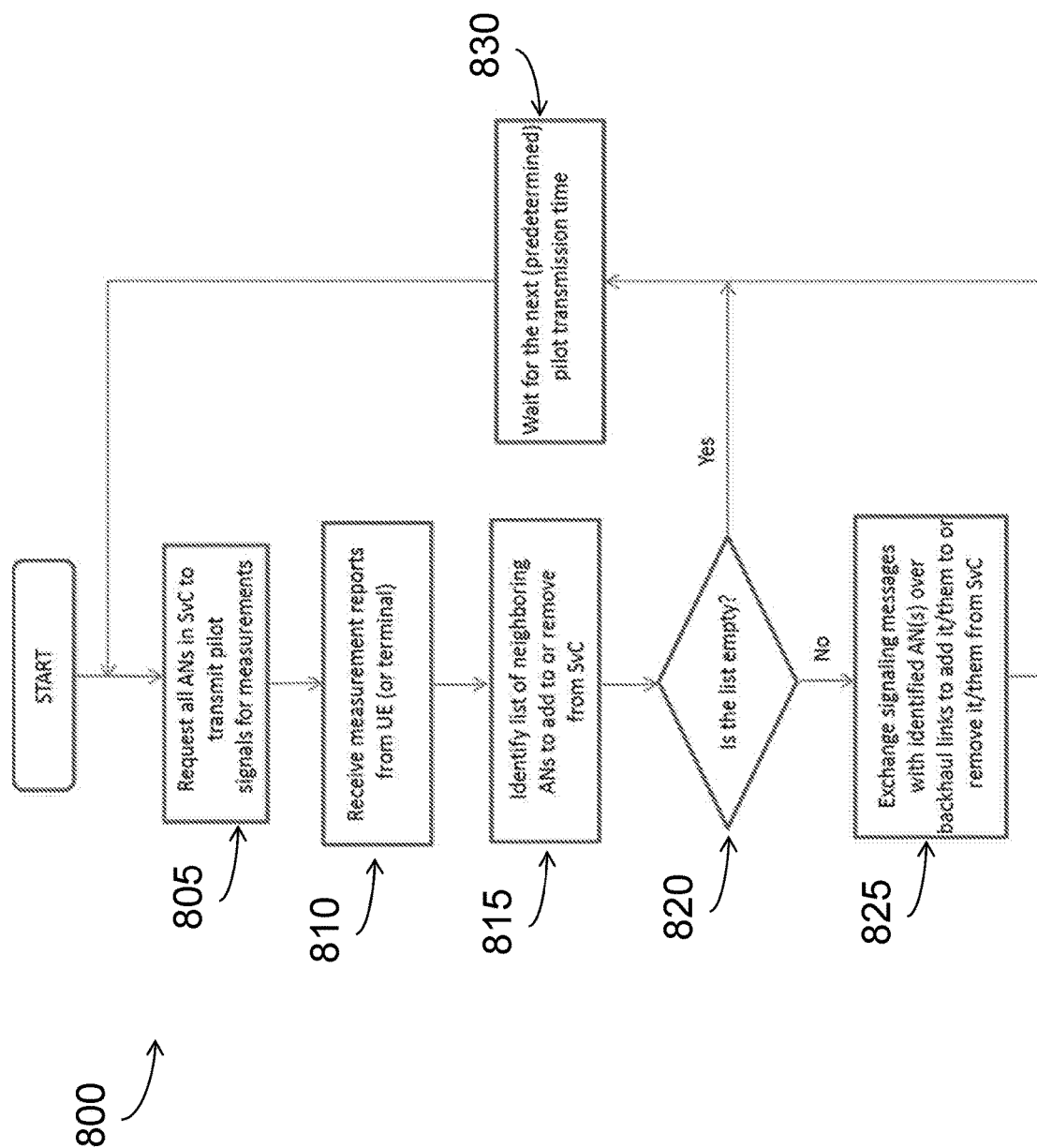
FIG. 8 illustrates an example method for configuring a service cluster, according to certain embodiments.

FIG. 8 illustrates an example method 800 for configuring a service cluster, according to certain embodiments. FIG. 8 summarizes the main steps in the procedure of periodically adding new A-SANs to and removing existing A-SANs from SvC by its P-SAN. In step 805, the P-SAN requests all ANs in a SvC to transmit pilot signals for measurements. The ANs make measurements and transmit measurement reports. In step 810, the P-SAN receives measurements reports from the UE and/or the ANs. In step 815, the P-SAN identifies a list of neighboring ANs to add to or remove from the SvC. The P-SAN determines in step 820 whether the list is empty. If the list is empty, then there are no changes to be made to the SvC and the P-SAN waits for the next pilot transmission time in step 830. If the list is not empty, then the P-SAN exchanges signaling messages with identified ANs over a backhaul connection to add the ANs to the SvC or to remove the ANs from the SvC.

As mentioned above, an AN 115 can simultaneously be an A-SAN for one SvC and a P-SAN for another SvC. In the role of A-SAN, an AN 115 is only supposed to temporally assist another P-SAN to communicate with its UE 110 as requested using its spare resources. When there is significant data flowing through an A-SAN, instead of the P-SAN, for a prolonged period of time, the roles between the P-SAN and the A-SAN should be switched. Such a decision is made by either the P-SAN or by the (last) MGF where data is retrieved from or forwarded to. Once a decision is made, the incumbent P-SAN should take the necessary steps to transfer the P-SAN responsibility to the target A-SAN within the SvC. Since P-SAN and A-SAN are assumed to have already established a low-latency inter-AN connection over backhaul, the switching of P-SAN should be accomplished relatively smoothly and is a network operation that is transparent to UE 110.

For example, the decision on whether to change P-SAN can be made based on the relative amounts of utilization of all ANs 115 in the SvC. More precisely, one may define the Node Utilization Factor (NUF) of an AN(j), denoted by NUF(j), as the fraction of total throughput (combined for both downlink and uplink) of the SvC that passes through AN(j) (via any of its beams) over a predetermined long time period. If the P-SAN measures and keeps track of NUF(j) for each node in the SvC, it may then make the decision to initiate a change of P-SAN from the current AN(i) to another AN(i') if NUF(i') is significantly bigger than NUF(i).

Cluster migration provides a way for slowly tracking the long-term movement of a UE 110 across the network. It yields a desirable hysteresis effect in handling the potential rapid changes of connection points as UEs 110 move in a densely, and possibly irregularly, deployed network. Furthermore, when the decision on the change of P-SAN is made locally at the P-SAN, only local communications among SANs within a SvC are needed to support the decision making. It is therefore also well suitable for distributed mobility management where no centralized mobility management entity is needed, which may be quite attractive for user-deployed, self-organizing networks. An example, corresponding method is described below.

Figure 9:
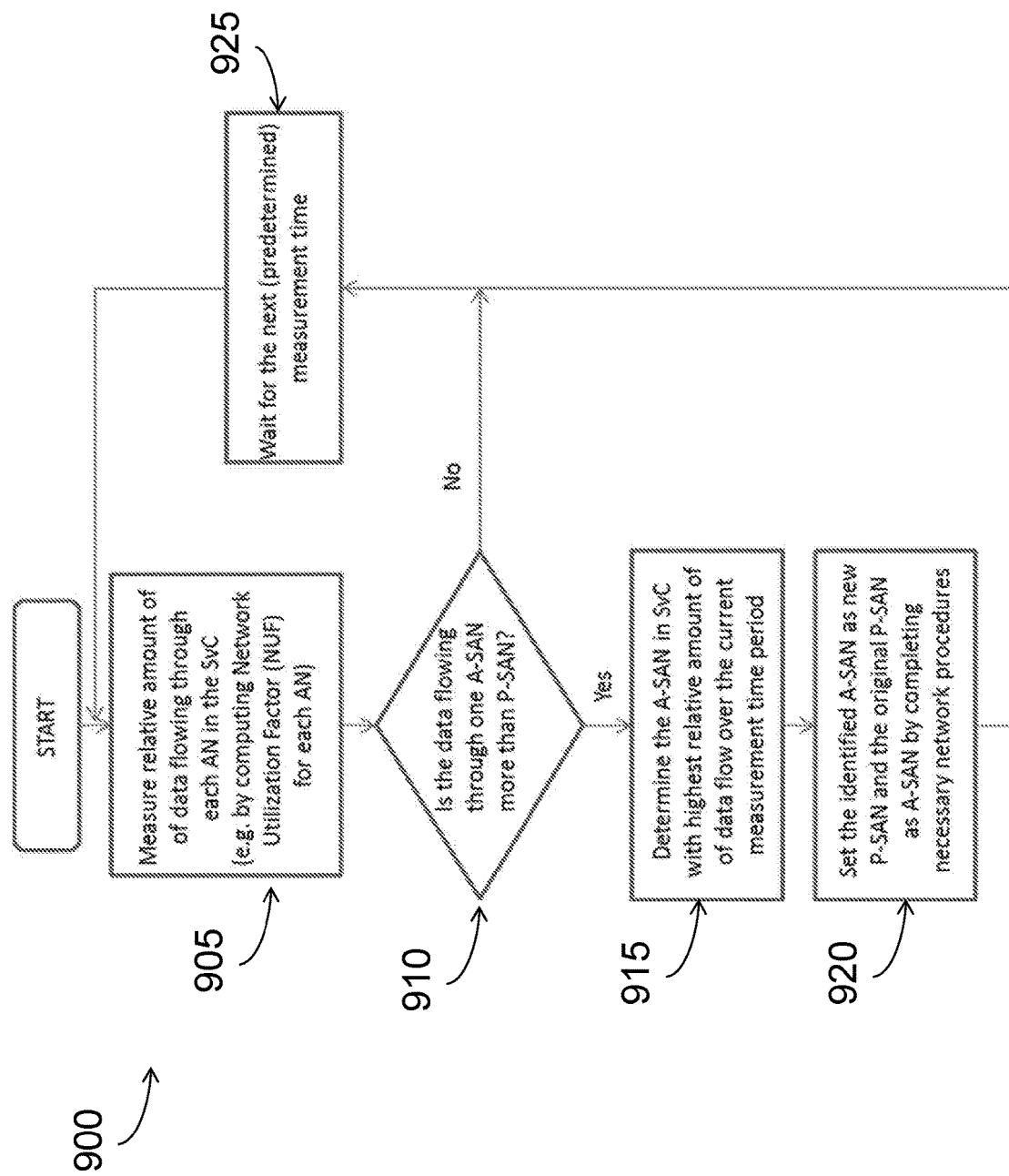
FIG. 9 illustrates an example method for transitioning an assistant serving access node to be a principal serving access node, according to certain embodiments.

FIG. 9 illustrates an example method for transitioning an assistant serving access node to be a principal serving access node, according to certain embodiments. In step 905, a P-SAN measures relative amounts of data flowing through each AN in an SvC. The P-SAN determines whether the data flowing through one A-SAN more than the data flowing through the P-SAN in step 910. In particular embodiments, the P-SAN considers factors in addition to the amount of data flow, such as the amount of time the A-SAN has been communicating with the UE and the number of packets communicated by the A-SAN to the UE. If the A-SAN is not communicating more data than the P-SAN, then the P-SAN waits for the next measurement time in step 925. If the A-SAN is communicating more data to the UE than the P-SAN, then the P-SAN can begin switching roles with the A-SAN. In step 915, the P-SAN determines the A-SAN in the SvC with the highest relative amount of data flow over the current measurement time period. Then in step 920, the P-SAN sets the identified A-SAN as the new P-SAN and sets itself (the original P-SAN) as an A-SAN. In particular embodiments, the P-SAN communicates a request to the A-SAN to begin the role switching procedure. When the A-SAN receives the request, the A-SAN will assume the role of the P-SAN.

FIG. 10 is a block diagram illustrating certain embodiments of a radio network controller and/or a core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 include processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to any suitable node, such as a gateway, switch, router, Internet, Public Switched Telephone Network (PSTN), network nodes 115, radio network controllers 120 or core network nodes 130, etc.

Processor 1020 may include any suitable combination of hardware and software implemented in one or more modules to execute instructions and manipulate data to perform some or all of the described functions of the radio network controller or core network node 800. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Certain embodiments of the present disclosure may provide one or more technical advantages. For example, in certain embodiments, the systems and methods allow more robust performance against sudden signal interruptions. Some embodiments reduce data loss and/or dropped packets caused by signal interruptions. Certain embodiments reduce signal interruptions while a device is moving.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A wireless communication network comprising:
an assistant serving access node; and
a principal serving access node configured to:
receive one or more measurement reports;
determine, based on a strength of a connection between the user equipment and the principal serving access node, that the user equipment should communicate over a different connection;
in response to the determination that the user equipment should communicate over the different connection and based on the one or more measurement reports, communicate, to the assistant serving access node, an assistance request to communicate one or more data packets to the user equipment; and
wherein the assistant serving access node is configured to:
buffer the one or more data packets of the plurality of data packets before receiving the assistance request from the principal serving access node; and
in response to receiving the assistance request, communicate the one or more data packets to the user equipment;

wherein the principal serving access node is further configured to:
determine, based on a period of time, over which the assistant serving access node communicated the one or more packets to the user equipment over a first connection between the assistant serving access node and the user equipment, that the assistant serving access node (415) should be a second principal serving access node for the user equipment; and
in response to the determination that the assistant serving access node should be the second principal serving access node, communicate a request to the assistant serving access node, the request indicating that the assistant serving access node should be the second principal serving access node for the user equipment.

2. The wireless communication network of claim 1, wherein:
the principal serving access node is further configured to communicate a first request to the assistant serving access node based on a strength of a first connection between the assistant serving access node and the user equipment;
the assistant serving access node is further configured to buffer the one or more data packets in response to receiving the first request.

3. The wireless communication network of claim 1, wherein:
the principal serving access node is further configured to communicate a second request to an access node based on a received Doppler frequency of the user equipment; and
the access node is configured to buffer the one or more data packets in response to receiving the second request.

4. The wireless communication network of claim 1, wherein:
the principal serving access node is further configured to:
receive a second measurement report indicating a strength of a first connection between the assistant serving access node and the user equipment; and
communicate a request to the assistant serving access node based on the strength of the first connection; and
the assistant serving access node stops buffering the one or more data packets in response to receiving the request.

5. The wireless communication network of claim 1, wherein the principal serving access node is further configured to:
wake an access node from a sleep mode; and
after the access node wakes, receive a measurement report from the access node indicating a strength of a connection between the access node and the user equipment.

6. The wireless communication network of claim 1, wherein the determination that the assistant serving access node should be the second principal serving access node for the user equipment is further based on a number of the one or more packets communicated by the assistant serving access node to the user equipment over the first connection.

7. The wireless communication network of claim 1, wherein:
the assistant serving access node comprises a plurality of antennas, each antenna positioned to face a direction different the other antennas of the plurality of antennas; and
for each antenna of the plurality of antennas, the one or more measurement reports indicate a strength of a connection between that antenna and the user equipment.

8. The wireless communication network of claim 1, wherein the one or more measurement reports comprise at least one of:
a received signal strength indicator of the user equipment;
a channel quality indicator of the user equipment; and
a history of acknowledgements and negative acknowledgements of the user equipment.

9. The wireless communication network of claim 1 further comprising a backhaul connection configured to connect the principal serving access node to the assistant serving access node.

10. A principal serving access node comprising:
an antenna configured to communicate with a user equipment;
a processor coupled to the antenna, the processor configured to:
receive one or more measurement reports;
determine, based on a strength of a connection between the user equipment and the principal serving access node, that the user equipment should communicate over a different connection;
in response to the determination that the user equipment should communicate over the different connection and based on the one or more measurement reports, communicate an assistance request to the assistant serving access node to communicate one or more data packets to the user equipment; and
maintain a list identifying the assistant serving access node, the list indicating that the assistant serving access node has buffered the one or more data packets before the assistant serving access node received the assistance request;
wherein the processor is further configured to:
determine, based on a period of time over which the assistant serving access node communicated the one or more packets to the user equipment over a first connection between the assistant serving access node and the user equipment, that the assistant serving access node should be a second principal serving access node for the user equipment; and
in response to the determination that the assistant serving access node should be the second principal serving access node, communicate a request to the assistant serving access node the request indicating that the assistant serving access node should be the second principal serving access node for the user equipment.

11. The principal serving access node of claim 10, wherein the assistant serving access node communicates the one or more data packets to the user equipment in response to receiving the assistance request.

12. The principal serving access node of claim 10, wherein the processor is further configured to communicate through the antenna a first request to the assistant serving access node based on a strength of a first connection between the assistant serving access node and the user equipment, wherein the assistant serving access node buffers the one or more data packets in response to receiving the first request.

13. The principal serving access node of claim 10, wherein the processor is further configured to communicate through the antenna a second request to an access node based on a received Doppler frequency of the user equipment, wherein the access node buffers the one or more data packets in response to receiving the third request.

14. The principal serving access node of claim 10, wherein the processor is further configured to:
   receive a second measurement report indicating a strength of a first connection between the assistant serving access node and the user equipment; and
   communicate a request to the assistant serving access node based on the strength of the first connection, wherein the assistant serving access node stops buffering the one or more data packets in response to receiving the request.

15. The principal serving access node of claim 10, wherein the processor is further configured to:
   wake an access node from a sleep mode; and
   after the access node wakes, receive a measurement report from the access node indicating a strength of a connection between the access node and the user equipment.

16. The principal serving access node of claim 10, wherein the determination that the assistant serving access node should be the second principal serving access node for the user equipment is further based on a number of the one or more packets communicated by the assistant serving access node to the user equipment over the first connection.

17. The principal serving access node of claim 10, wherein:
   the assistant serving access node comprises a plurality of antennas, each antenna positioned to face a direction different from the other antennas of the plurality of antennas; and
   for each antenna of the plurality of antennas, the one or more measurement reports indicate a strength of a connection between that antenna and the user equipment.

18. The principal serving access node of claim 10, wherein the one or more measurement reports comprises at least one of:
   a received signal strength indicator of the user equipment;
   a channel quality indicator of the user equipment; and
   a history of acknowledgements and negative acknowledgements of the user equipment.

19. A method comprising:
   receiving one or more measurement reports;
   determining, based on a strength of a connection between the user equipment and a principal serving access node that the user equipment should communicate over a different connection;
   in response to the determination that the user equipment should communicate over the different connection and based on the one or more measurement reports, communicating an assistance request to the assistant serving access node to communicate one or more data packets to the user equipment; and
   maintain a list identifying the assistant serving access node, the list indicating that the assistant serving access node has buffered the one or more data packets before the assistant serving access node received the assistance request;
   the method further comprising;
   determining, based on a period of time over which the assistant serving access node communicated the one or more packets to the user equipment over a first connection between the assistant serving access node and the user equipment, that the assistant serving access node should be a second principal serving access node for the user equipment; and
   in response to the determination that the assistant serving access node should be the second principal serving access node, communicating a first request to the assistant serving access node, the first request indicating that the assistant serving access node should be the second principal serving access node for the user equipment.

20. The method of claim 19, wherein the assistant serving access node communicates the one or more data packets to the user equipment in response to receiving the assistance request.

21. The method of claim 19, further comprising communicating a first request to the assistant serving access node based on a strength of a first connection between the assistant serving access node and the user equipment, wherein the assistant serving access node buffers the one or more data packets in response to receiving the first request.

22. The method of claim 19 further comprising communicating a second request to an access node based on a received Doppler frequency of the user equipment, wherein the access node buffers the one or more data packets in response to receiving the second request.

23. The method of claim 21, further comprising:
   receiving a second measurement report indicating a strength of a first connection between the assistant serving access node and the user equipment; and
   communicating a request to the assistant serving access node based on the strength of the first connection, wherein the assistant serving access node stops buffering the one or more data packets in response to receiving the request.

24. The method of claim 19, further comprising:
   waking an access node from a sleep mode; and
   after the access node wakes, receiving a measurement report from the access node indicating a strength of a connection between the access node and the user equipment.

25. The method of claim 19, wherein the determination that the assistant serving access node should be the second principal serving access node for the user equipment is further based on a number of the one or more packets communicated by the assistant serving access node to the user equipment over the first connection.

26. The method of claim 19, wherein:
   the assistant serving access node comprises a plurality of antennas, each antenna positioned to face a direction different from the other antennas of the plurality of antennas; and
   for each antenna of the plurality of antennas, the one or more measurement reports indicate a strength of a connection between that antenna and the user equipment.

27. The method of claim 19, wherein the measurement report comprises at least one of:
   a received signal strength indicator of the user equipment;
   a channel quality indicator of the user equipment; and
   a history of acknowledgements and negative acknowledgements of the user equipment.

* * * * *